United States Patent
Lincoln et al.

(10) Patent No.: US 10,440,525 B2
(45) Date of Patent: Oct. 8, 2019

(54) D2D COMMUNICATIONS IN A CELLULAR NETWORK

(71) Applicant: Telefonaktiebolaget LM Ericsson (publ), Stockholm (SE)

(72) Inventors: Bo Lincoln, Lund (SE); Hakan Bjorkegren, Taby (SE); Gabor Fodor, Hasselby (SE); Fredrik Gunnarsson, Linkoping (SE); Jonas Kronander, Knivsta (SE); Anders Wallen, Ystad (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 8 days.

(21) Appl. No.: 15/572,042

(22) PCT Filed: Mar. 1, 2017

(86) PCT No.: PCT/EP2017/054746
§ 371 (c)(1),
(2) Date: Nov. 6, 2017

(87) PCT Pub. No.: WO2018/157924
PCT Pub. Date: Sep. 7, 2018

(65) Prior Publication Data
US 2019/0075430 A1    Mar. 7, 2019

(51) Int. Cl.
*H04W 4/70* (2018.01)
*H04W 4/08* (2009.01)
(Continued)

(52) U.S. Cl.
CPC .............. *H04W 4/08* (2013.01); *H04W 4/70* (2018.02); *H04W 24/10* (2013.01); *H04W 76/14* (2018.02);
(Continued)

(58) Field of Classification Search
CPC ..... H04W 4/005; H04W 4/008; H04W 72/04; H04W 72/048; H04W 84/18;
(Continued)

(56) References Cited

U.S. PATENT DOCUMENTS 9,084,222 B2    7/2015    Chai et al.
9,143,291 B2 *  9/2015    Kuchibhotla ........... H04L 5/001
(Continued)

FOREIGN PATENT DOCUMENTS

WO    2016126099 A1    8/2016
WO    2016163972 A1    10/2016

OTHER PUBLICATIONS

PCT International Search Report, dated Nov. 17, 2017, in connection with International Application No. PCT/EP2017/054746, all pages.

(Continued)

*Primary Examiner* — Mohamed A Kamara
(74) *Attorney, Agent, or Firm* — Leffler Intellectual Property Law, PLLC

(57) ABSTRACT

A method performed by a first transceiver device in D2D communication with second transceiver devices in a cellular network comprises transmitting a reference signal comprising an identity of the first transceiver device, and receiving feedback messages from the second transceiver devices, where a feedback message comprises the identity of the first and an identity of the second transceiver device, and channel characteristics of a radio channel between the first and the second transceiver device, where the channel characteristics are estimated by the second transceiver device. The method further comprises deciding, based on the feedback messages, whether a second transceiver device should be included in a set of intended devices to which the first transceiver device will perform a transmission of a communication signal. The (Continued)

method also comprises performing a transmission of the communication signal to the set of intended devices, where the transmission is adapted to the set of intended devices based on the feedback messages received from the intended devices.

18 Claims, 11 Drawing Sheets

(51) Int. Cl.
  *H04W 76/14* (2018.01)
  *H04W 24/10* (2009.01)
(52) U.S. Cl.
  CPC .......... *Y02D 70/00* (2018.01); *Y02D 70/1262* (2018.01); *Y02D 70/20* (2018.01); *Y02D 70/21* (2018.01); *Y02D 70/22* (2018.01)
(58) Field of Classification Search
  CPC ....... H04W 68/00; H04W 12/08; H04W 8/26; H04W 72/02; H04W 72/005; H04W 28/0221; H04W 60/00; G01D 5/00; H04L 67/12; H04L 63/104
  See application file for complete search history.

(56) References Cited

U.S. PATENT DOCUMENTS

| | | | |
|---|---|---|---|
| 9,363,702 B2 | 6/2016 | He et al. | |
| 2013/0029713 A1* | 1/2013 | Jang | H04W 24/10 455/517 |
| 2014/0010172 A1 | 1/2014 | Wei et al. | |
| 2014/0098759 A1 | 4/2014 | Noh et al. | |
| 2014/0130137 A1* | 5/2014 | Baek | H04W 12/08 726/4 |
| 2014/0357269 A1* | 12/2014 | Zhou | H04W 76/14 455/434 |
| 2015/0195824 A1 | 7/2015 | Choi et al. | |
| 2016/0007304 A1* | 1/2016 | Morita | H04W 52/367 370/311 |
| 2019/0007827 A1* | 1/2019 | Huang | H04W 4/00 |

OTHER PUBLICATIONS

PCT Written Opinion, dated Nov. 17, 2017, in connection with International Application No. PCT/EP2017/054746, all pages.

\* cited by examiner

D2D COMMUNICATIONS IN A CELLULAR NETWORK

TECHNICAL FIELD

The proposed technology generally relates to cellular networks and more specifically to device-to-device communications in cellular networks.

BACKGROUND

Cellular network-controlled short range communications between wireless communication devices and the integration of ad-hoc networking in cellular networks have been the topic of research since the late 90's. It has been found that short-range communication can take advantage of a cellular control layer in distributing content between mobile users relying on unlicensed spectrum resources in a peer-to-peer fashion. In 3GPP Release 12, device to device (D2D) communications, or proximity services (ProSe) communications, are mainly motivated by maintaining communications capabilities in public safety situations, although D2D communications can be used in other situations as well. According to the associated requirements, ProSe communication has to work in regions, where network coverage cannot be guaranteed. Therefore, ProSe communications are specified for in-coverage, partial coverage and out-of-coverage scenarios (see FIG. 1).

In LTE, D2D communications are made possible by transmitting and receiving control signaling and user data on the sidelink, SL (that complements the communication services using uplink (UL) and downlink (DL)). Specifically, the 3GPP has specified physical layer (PHY) channels, including the PHY sidelink shared channel (PSSCH) and the PHY sidelink broadcast channel (PSBCH) to transmit data to a specific peer device and to broadcast user data to a set of peer devices using the sidelink physical resources. Currently, the sidelink PHY layer resources are a subset of the cellular UL resources. In future (5G) networks, it can be expected that sidelinks will use both cellular UL and DL PHY resources.

In 3GPP Release 12, the PHY layer for D2D communications can be based on broadcast services, that is the D2D transmitter does not address user data packets to a specific receiver node, but any node in the proximity can receive and decode the transmitted packets. Consequently, the broadcast transmission does not consider the large or small scale channel conditions of any particular receiver node. Therefore, the spectral and energy efficiency of the broadcast transmission is typically low. Furthermore, some of the intended receivers may not be able to receive the intended data packets, or the bit error rate (BER) of the received data packets is high and the experienced quality of service (QoS) is low.

Therefore, there is a need for an improved method for D2D communications in cellular networks.

SUMMARY

It is an object to provide methods, devices and a computer program for device-to-device communications in cellular networks.

This and other objects are met by embodiments of the proposed technology.

According to a first aspect, there is provided a method performed by a first transceiver device in device-to-device, D2D, communication with at least one second transceiver device in a cellular network. The method comprises the steps of transmitting a reference signal comprising information about an identity of the first transceiver device, and receiving at least one feedback message from a respective second transceiver device, where each feedback message comprises information about the identity of the first transceiver device, information about an identity of the respective second transceiver device that sent the feedback message, and channel characteristics of a radio channel between the first transceiver device and the respective second transceiver device, where the channel characteristics are estimated by the respective second transceiver device. The method further comprises the steps of deciding whether the respective second transceiver device should be included in a set of intended devices to which the first transceiver device will perform a transmission of at least one communication signal, where the step of deciding is based on the at least one received feedback message. The method also comprises the step of performing a transmission of the at least one communication signal to the set of intended devices, where the transmission is adapted to the set of intended devices based on the feedback messages received from the respective second transceiver devices included in the set.

According to a second aspect, there is provided a method performed by a second transceiver device in device-to-device, D2D, communication with a first transceiver device in a cellular network. The method comprises the steps of receiving a reference signal comprising information about an identity of the first transceiver device, estimating characteristics of a radio channel between the first transceiver device and the second transceiver device, based on the received reference signal, and transmitting a feedback message comprising information about the identity of the first transceiver device, information about an identity of the second transceiver device, and the estimated channel characteristics.

According to a third aspect, there is provided an apparatus in a first transceiver device configured to perform device-to-device, D2D, communication with at least one second transceiver device in a cellular network. The apparatus is configured to transmit a reference signal comprising information about an identity of the first transceiver device, and to receive at least one feedback message from a respective second transceiver device, where each feedback message comprises information about the identity of the first transceiver device, information about an identity of the respective second transceiver device that sent the feedback message, and channel characteristics of a radio channel between the first transceiver device and the respective second transceiver device, where the channel characteristics are estimated by the respective second transceiver device. The apparatus is further configured to decide, based on the at least one received feedback message, whether the respective second transceiver device should be included in a set of intended devices to which the first transceiver device will perform a transmission of at least one communication signal. The apparatus is also configured to perform a transmission of the at least one communication signal to the set of intended devices, where the transmission is adapted to the set of intended devices based on the feedback messages received from the respective second transceiver devices included in the set.

According to a fourth aspect, there is provided a transceiver device comprising such an apparatus.

According to a fifth aspect, there is provided an apparatus in a second transceiver device configured to perform device-to-device, D2D, communication with a first transceiver device in a cellular network. The apparatus is configured to receive a reference signal comprising information about an identity of the first transceiver device. The apparatus is further configured to estimate characteristics of a radio channel between the first transceiver device and the second transceiver device, based on the received reference signal. The apparatus is also configured to transmit a feedback message comprising information about the identity of the first transceiver device, information about an identity of the second transceiver device, and the estimated channel characteristics.

According to a sixth aspect, there is provided a transceiver device comprising such an apparatus.

According to a seventh aspect, there is provided a computer program for performing, when executed by a processor, device-to-device, D2D, communication with at least one second transceiver device in a cellular network, where the computer program comprises instructions, which when executed by the processor, cause the processor to prepare a reference signal comprising information about an identity of the first transceiver device, for transmission, and to input at least one feedback message received from a respective second transceiver device, where each feedback message comprises information about the identity of the first transceiver device, information about an identity of the respective second transceiver device that sent the feedback message, and channel characteristics of a radio channel between the first transceiver device and the respective second transceiver device, where the channel characteristics are estimated by the respective second transceiver device. The processor further decides, based on the at least one received feedback message, whether the respective second transceiver device should be included in a set of intended devices to which the first transceiver device will perform a transmission of at least one communication signal, and prepares a transmission of the at least one communication signal to the set of intended devices, where the transmission is adapted to the set of intended devices based on the feedback messages received from the respective second transceiver devices included in the set.

According to an eighth aspect, there is provided a computer program for performing, when executed by a processor, device-to-device, D2D, communication with a first transceiver device in a cellular network, where the computer program comprises instructions, which when executed by the processor, cause the processor to input a reference signal comprising information about an identity of the first transceiver device, to estimate characteristics of a radio channel between the first transceiver device and the second transceiver device, based on the received reference signal, and to prepare a feedback message, comprising information about the identity of the first transceiver device, information about an identity of the second transceiver device, and the estimated channel characteristics, for transmission.

According to a ninth aspect, there is provided a computer-program product comprising a computer-readable medium having stored thereon at least one computer program according to the above.

According to a tenth aspect, there is provided an apparatus in a first transceiver device for performing device-to-device, D2D, communication with at least one second transceiver device in a cellular network. The apparatus comprises a transmitter module for transmitting a reference signal comprising information about an identity of the first transceiver device, and a receiver module for receiving at least one feedback message from a respective second transceiver device, where each feedback message comprises information about the identity of the first transceiver device, information about an identity of the respective second transceiver device that sent the feedback message, and channel characteristics of a radio channel between the first transceiver device and the respective second transceiver device, where the channel characteristics are estimated by the respective second transceiver device. The apparatus further comprises a decision module for deciding, based on the at least one received feedback message, whether the respective second transceiver device should be included in a set of intended devices to which the first transceiver device will perform a transmission of at least one communication signal. The apparatus also comprises a transmitter module for performing a transmission of the at least one communication signal to the set of intended devices, where the transmission is adapted to the set of intended devices based on the feedback messages received from the respective second transceiver devices included in the set.

According to an eleventh aspect, there is provided an apparatus in a second transceiver device for performing device-to-device, D2D, communication with a first transceiver device in a cellular network. The apparatus comprises a receiver module for receiving a reference signal comprising information about an identity of the first transceiver device, an estimation module for estimating characteristics of a radio channel between the first transceiver device and the second transceiver device, based on the received reference signal; and a transmitter module for transmitting a feedback message comprising information about the identity of the first transceiver device, information about an identity of the second transceiver device, and the estimated channel characteristics.

Some advantages of the proposed technology are:
The proposed solution allows a D2D transmitter to adapt its transmission to peer devices over a D2D communication channel (such as a sidelink in a 3GPP LTE system) without requiring a point-to-point a-priori (i.e. prior to the actual communication) association between transmitter and receiver(s). In particular, the proposed solution enables a transmitter node to not only adapt its transmission parameter to a specific communication channel, but also to adapt the set of receivers to the channel conditions.

The D2D transmitter can adapt its transmission to multiple pieces of channel state information at the same time, rather than adjusting the transmission parameters to a single CSI only.

Ultimately, the solution facilitates the spectral and energy efficient communication over D2D (sidelink) channels without requiring to set up peer-to-peer unicast communication channel between specific pairs of transmitters and receivers. Thereby, the solution increases the spectral and energy efficiency and the experienced QoS in D2D communication systems using broadcast/multicast communication modes.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

As described in the background section, there is a need for an improved method for D2D communications in cellular networks.

As described above, the PHY layer for D2D communications can be based on broadcast services, that is the D2D transmitter does not address user data packets to a specific receiver node, but any node in the proximity can receive and decode the transmitted packets. Consequently, the transmitting device does not adapt its transmission parameters to the large or small scale channel conditions of any particular receiver node. For example, the D2D transmitter does not exercise power control based on the path loss to any receiver node or does not employ adaptive modulation and coding of the transmitted packets/symbols depending on the estimated channel response. Likewise, the transmitter does not use a specific set of resources to communicate with a specific receiver, but uses the broadcast nature of the wireless medium to transmit to a set of receiver nodes.

State-of-the-art cellular and ad-hoc networks typically implement PHY and medium access control (MAC) layer channels, procedures and measurements that enable them to provide broadcast, multicast and unicast PHY layer services to higher layers. Cellular networks, for example, typically use the concept of a radio bearer between a specific transmitter (e.g. a base station, BS) and receiver (e.g. user equipment, UE) to allocate specific radio resources for a point-to-point link and employ PHY/MAC procedures to ensure quality of service and resource (spectral and/or energy) efficient communication between a transmitter and one or several receiver node(s). To this end, the transmitter uses measurement results to estimate characteristics of the communication channel between the transmitter and the receivers so that it can adapt its transmission (e.g. transmit power, modulation and coding scheme, beam pattern, etc.) characteristics to the current state of that communication channel.

Figure 1:
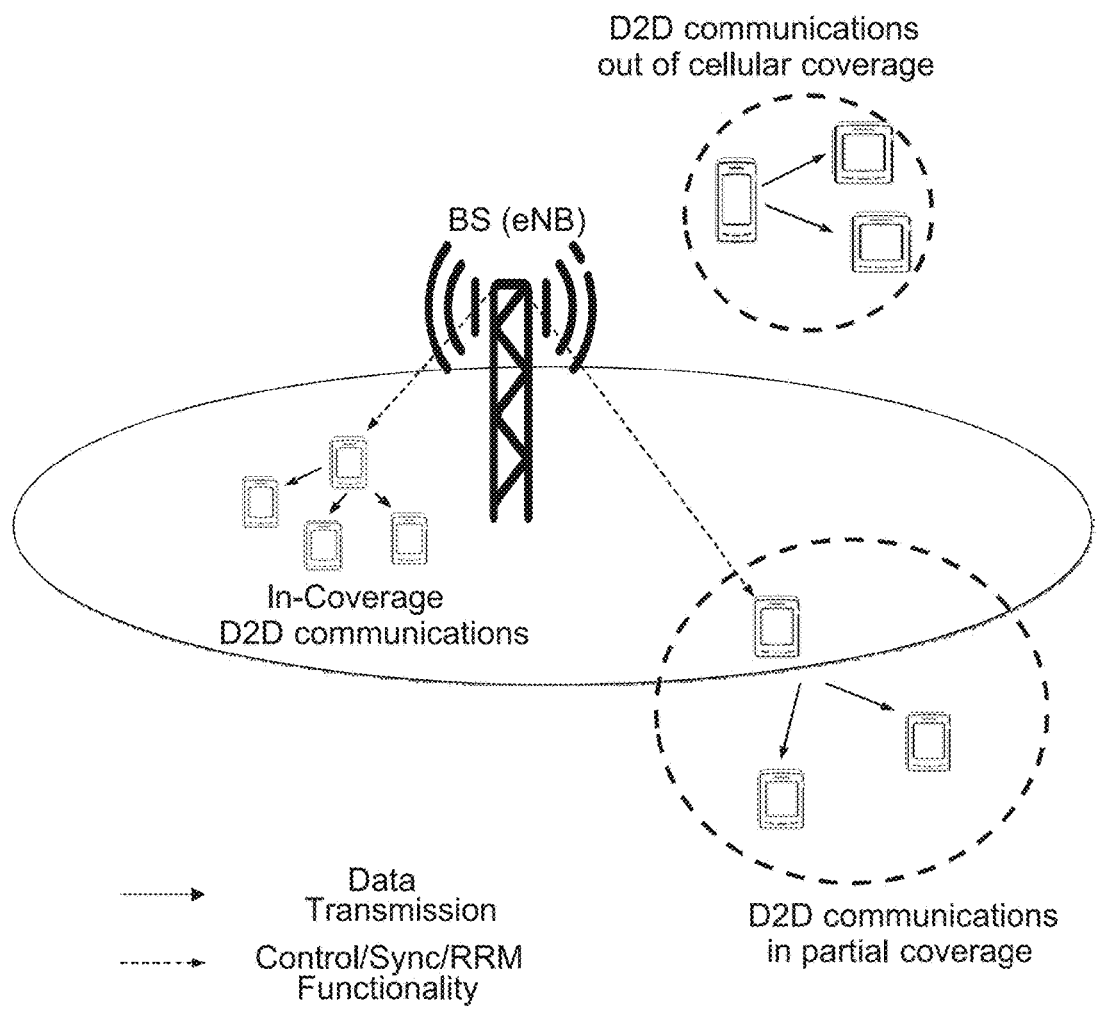
FIG. 1 is a schematic illustration of some D2D communication scenarios.

Consider a cellular network in which D2D communications are supported for in-coverage, partial coverage and out-of-coverage (groups of) devices (FIG. 1). The problem in this situation, using existing state-of-the-art technology, is that the transmitter device does not adapt its transmission parameters to the current state of the wireless medium when communicating with a set of peer devices (receivers) when using broadcast or multicast transmission. Thus, using existing technology, the spectral and energy efficiency of the broadcast/multicast transmission is typically low. Furthermore, some of the intended receivers may not be able to receive the intended data packets, or the bit error rate (BER) of the received data packets is high and the experienced quality of service (QoS) is low.

The present embodiments solve the above-mentioned problems by introducing a reporting of channel characteristics in the D2D system which can, when present, be used by the transmitter of a point-to-point, multicast or broadcast message to adapt the transmission to the current state of a single or multiple communication channel(s).

Figure 2:
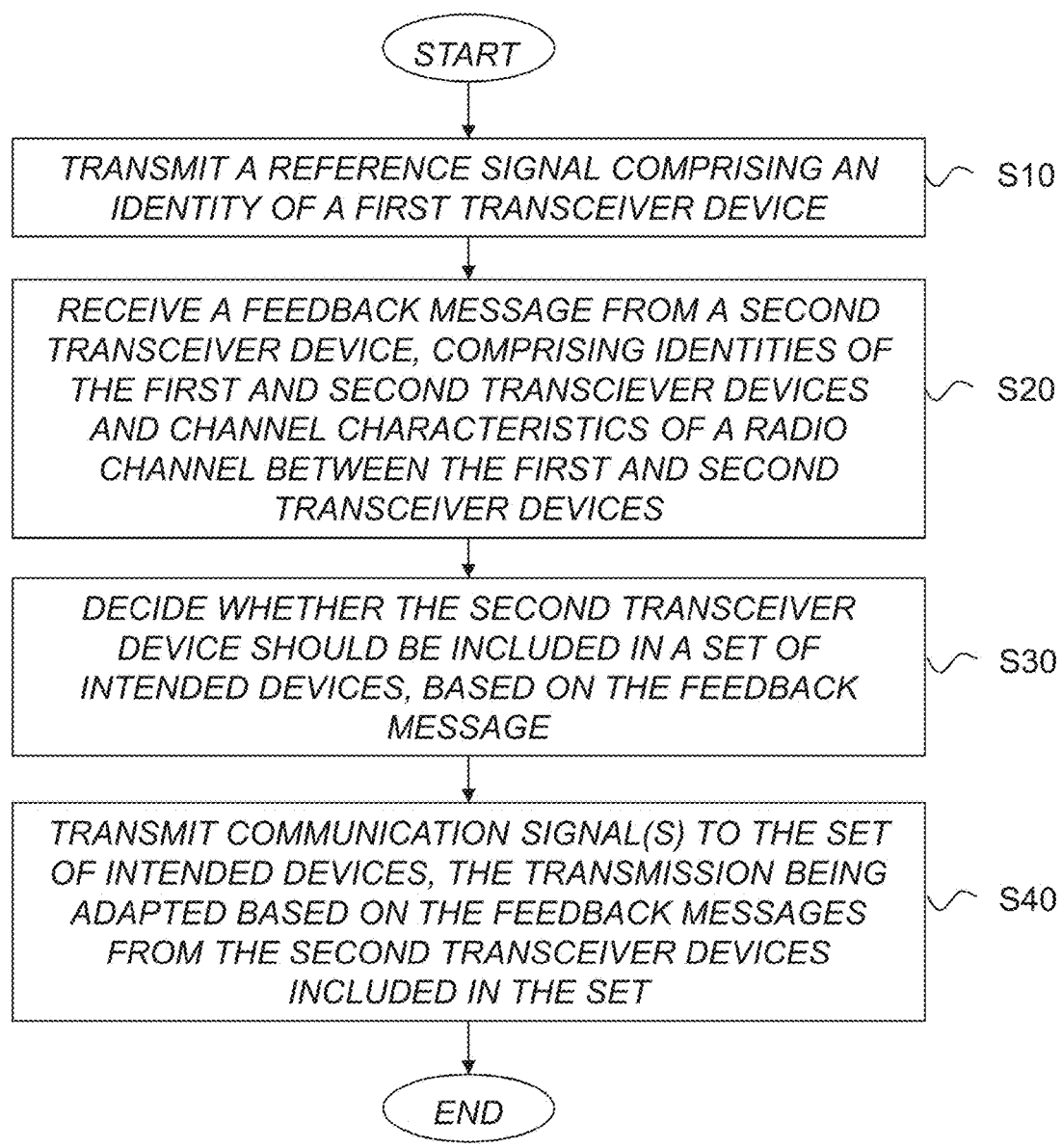
FIG. 2 is a schematic flow diagram illustrating an example of a method performed by a first transceiver device in D2D communication with at least one second transceiver device in a cellular network according to an embodiment.

FIG. 2 is a schematic flow diagram illustrating an example of a method performed by a first transceiver device in D2D communication with at least one second transceiver device in a cellular network according to an embodiment. The method comprises the step S10 of transmitting a reference signal comprising information about an identity of the first transceiver device, and the step S20 of receiving at least one feedback message from a respective second transceiver device, where each feedback message comprises information about the identity of the first transceiver device, information about an identity of the respective second transceiver device that sent the feedback message, and channel characteristics of a radio channel between the first transceiver device and the respective second transceiver device, where the channel characteristics are estimated by the respective second transceiver device. The method further comprises the step S30 of deciding whether the respective second transceiver device should be included in a set of intended devices to which the first transceiver device will perform a transmission of at least one communication signal, where the step of deciding is based on the at least one received feedback message. The method also comprises the step S40 of performing a transmission of the at least one communication signal to the set of intended devices, where the transmission is adapted to the set of intended devices based on the feedback messages received from the respective second transceiver devices included in the set.

An intended device at a certain point in time is a D2D reception capable device to which the first transceiver device will attempt to transmit a communication signal. If a device is excluded from this set, it means that the first transceiver device will not try to adapt its transmission so that it could reach that D2D device.

In an embodiment of the method of FIG. 2, the step S10 of transmitting a reference signal comprises broadcasting the reference signal.

In a particular embodiment, the transmission of the at least one communication signal is adapted to the set of intended devices by deciding on the transmission mode and/or determining transmission parameters for the transmission, using the feedback messages received from the respective second transceiver devices included in the set. The transmission mode may be unicast mode, multicast mode or broadcast mode.

In other words, a solution to the problems presented above, as proposed in the current disclosure is to collect a set of channel characteristics information from potential receivers and, using that set of information, decide on a set of intended receivers and whether a transmission to the determined set of intended receivers should be broadcast/multicast or unicast transmission, and to determine the employed single set or multiple sets of transmission parameters to the determined transmission modes and receives nodes.

To determine the transmission parameters may in different embodiments include adapting at least one of transmission power, modulation and coding rate, beam selection or beam shape, numerology of an orthogonal frequency-division multiplexing, OFDM, system, and source coding of a payload (for example when the channel quality does not allow for transmission of High Definition (HD) audio or video).

The reference/pilot signal may in an embodiment be acquired from e.g. a network node such as a base station in the cellular network, it may in another embodiment be pre-configured in the first transceiver device, and in yet another embodiment it may be determined or selected by the first transceiver device.

Figure 3:
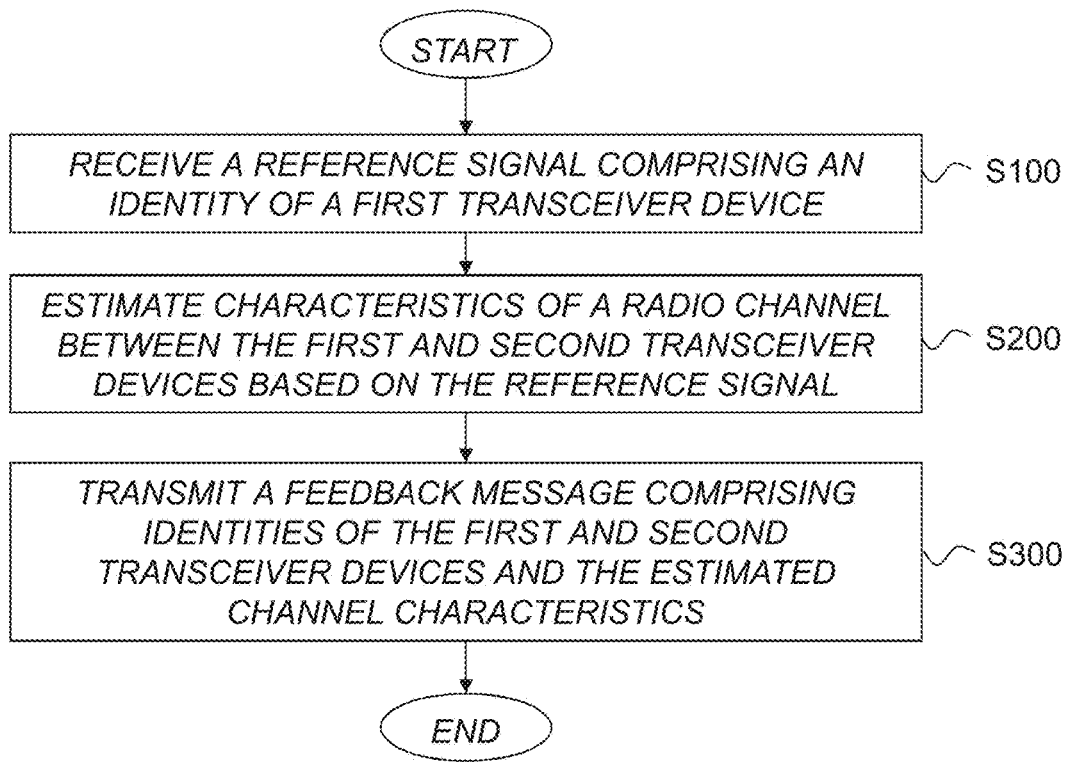
FIG. 3 is a schematic flow diagram illustrating an example of a method performed by a second transceiver device in D2D communication with a first transceiver device in a cellular network according to an embodiment.

FIG. 3 is a schematic flow diagram illustrating an example of a method performed by a second transceiver device in device-to-device, D2D, communication with a first transceiver device in a cellular network. The method comprises the step S100 of receiving a reference signal comprising information about an identity of the first transceiver device, the step S200 of estimating characteristics of a radio channel between the first transceiver device and the second transceiver device, based on the received reference signal, and the step S300 of transmitting a feedback message comprising information about the identity of the first transceiver device, information about an identity of the second transceiver device, and the estimated channel characteristics.

In an embodiment of the method of FIG. 3, the step S300 of transmitting a feedback message comprises broadcasting the feedback message.

The estimated channel characteristics, or channel state information (CSI), may in different embodiment comprise at least one of received power, estimated path loss or complex channel response, or other suitable channel characteristics. The feedback message comprising such channel characteristics, together with the identities of the first and second transceiver devices, may be transmitted e.g. in predefined frequency channels in an embodiment, or in predefined time slots in another embodiment.

In the following, some non-limiting example embodiments are described.

The present invention solves the aforementioned problem by introducing an optional Channel State Reporting (CSI) in the D2D system which can, when present, be used by the transmitter of a point-to-point, multicast or broadcast message to adapt the transmission to the current state of a single or multiple communication channel(s). The adaptation of the transmission to the set of communication channels to a set of D2D receiver nodes is made possible by the following components (steps):

1. The D2D transmitter continuously transmits/broadcasts pilot (known reference) signals that encode the D2D transmitter's identity (ID) information. This pilot signal is constructed by a sequence of predefined symbols, such that the sequence length makes the distinction of the code domain signal possible with high probability. In addition, the D2D transmitter may optionally
   a. transmit a source identifier or address of the D2D transmitter in the MAC layer, wherein the source identifier may or may not be related to the identifier used in the PHY layer. The source address may be pre-configured, configured by a network node, or selected by the D2D transmitter.
   b. transmit a target identifier or address of the D2D receiver in the MAC layer, wherein the target identifier may identify all targets (broadcast address), targets of a group (group address), or a specific target. These addresses may be pre-configured, or signaled by a network node.
2. Potential D2D receivers that can capture and decode a specific pilot signal (and/or a specific layer 2 address) measure on the characteristics of the received signal (e.g. received power) and identify the transmitter, based on the decoded transmitter ID. The Receivers also estimate characteristics of the radio channel between the transmitter device and itself, that is the receivers perform channel estimation based on the received pilot signal.
3. The receivers transmit/broadcast their estimated channel characteristics (e.g. estimated path loss, complex channel response) along with the ID of the transmitter node and their own ID. This message is referred to as the CSI feedback message (i.e. feedback from the receivers to the transmitter node). The CSI feedback message may e.g. be transmitted continuously, or periodically, or triggered etc.
4. The transmitter continuously receives and decodes such broadcast messages by receivers. Each receiver may have a specific (own) frequency channel or time slot or encoding scheme for the transmission of the CSI feedback that keeps the probability of collision of CSI feedback messages low (but not necessarily zero).
5. The D2D transmitter uses the received CSI feedbacks to decide on the transmission mode and the applied transmission parameters, including:
   Whether it should include or exclude a potential receiver to the set of intended receivers. An intended receiver at a certain point in time is a D2D reception capable device to which the transmitter will attempt to transmit a packet (communication signal). If the receiver is excluded from this set, it means that the transmitter will not try to adopt its transmission such that it could reach that D2D device. In such a case, the transmitter may for example set up a separate communication with that particular receiver.
   Whether it should send the subsequent packets (communication signals) in unicast or multicast mode (to the set of intended receivers) or in broadcast mode.

What transmission parameters it should use for the subsequent transmission or transmissions for its broadcast, multicast or unicast transmission of the transmitted packets (communications signals).

Figure 4:
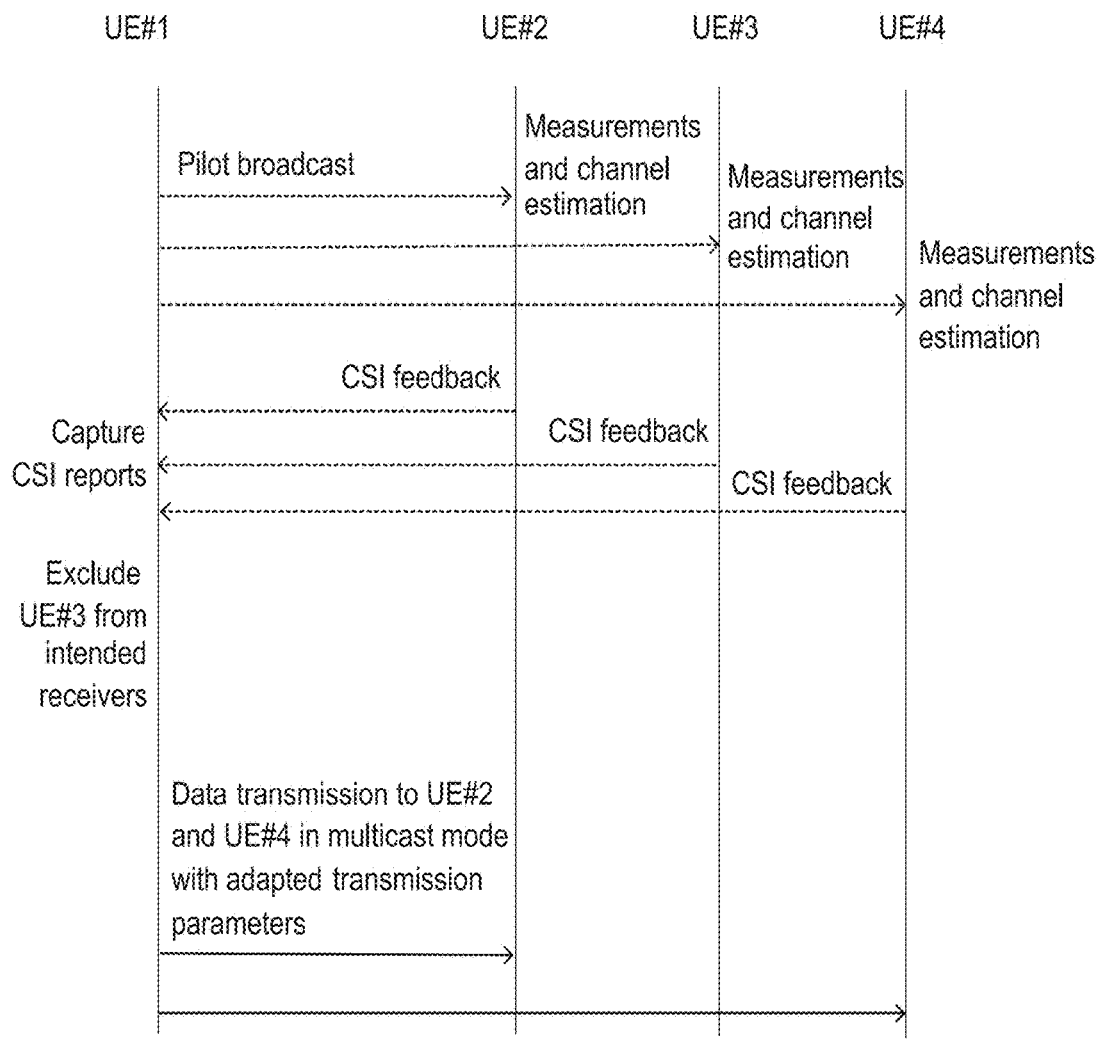
FIG. 4 is a schematic diagram illustrating a particular example embodiment of operation of D2D communications between transceiver devices in a cellular network.

FIG. 4 is a schematic diagram illustrating a particular example embodiment of operation of D2D communications between a transmitter device (UE#1) and multiple D2D receiver devices in a cellular network. In this example, UE#1 (transmitter) decides to exclude UE#3 (receiver) from the set of intended receiver devices, while it adapts its transmission parameters to a joint transmission to UE#2 and UE#4.

The above steps 1-5 are described in more detail as follows:

Step 1: Assigning Pilot Sequences and Transmitting Pilot (Reference) Signals

Devices that want to transmit user data to a set of receivers obtain pilot sequences that they will use in subsequent pilot transmissions. The acquisition of the pilot sequence can be assisted by the cellular network (not shown in FIG. 4) by, for example a network node such as a base station (BS) assigning the pilot sequence to the device when the device first attaches to the network. The pilot sequence can also be preconfigured by an operation and maintenance entity for a longer period of time (days or longer) in the case of a stationary device. Another reason for pre-configuring the pilot sequence of for allowing the device to select it, is to support situations when the device is out of coverage.

In the example of FIG. 4, UE#1 is preconfigured with a unique identity (ID) and a specific pilot sequence (e.g. a Zadoff-Chu sequence of complex symbols). UE#1 is also preconfigured with a set of parameters related to the pilot signal transmission, e.g. periodicity, transmit frequency, transmit power. UE#1 uses these parameters to transmit its pilot sequence. This can happen with short inter-transmission time, in the order of 10 milliseconds or in less frequent intervals in the order of 100 milliseconds or more.

In another embodiment, the device also sends a message associated to the pilot signal. The message can comprise layer 2 address information such as a source address and a target address. The source address may in one mode of the embodiment be related to the identity associated to the pilot signals. In another mode, the source address is assigned to the device by the network at a previous occasion. In yet another mode, the source address is pre-configured. In yet another mode, the source address is randomly selected by the device.

The target address of the message may be a specific address pre-configured as a broadcast address, meaning that all devices will check the message and monitor/measure the pilot signal. In another mode, the target address may be a group address, meaning that only devices configured as group members (configured to monitor the group target address) will monitor/measure the pilot signal. The group address may be pre-configured, or configured via a network node. One example of such a network node implements a Proximity Services (ProSe) function, managing D2D groups among other things.

The target address may also be to a specific device, in case higher layers have configured the signal to only be targeted a specific device. One example, where this may be the case is when the device is only allowed to communicate via D2D with a specific target device.

Step 2 and Step 3: Capturing Pilot Signals and CSI Feedback

Potential D2D receivers continuously listen and attempt to decode transmitted pilot sequences and the associated ID of the respective transmitter devices. Capturing the pilot signals enable the receiver nodes to update their current estimates of the parameters that characterize the wireless channel between the transmitter of the pilot signal and the receiver node. These parameters may be related to the large scale fading (estimated path loss) as well as to the small scale fading of the wireless channel.

In this step, the D2D receivers compile a CSI report that they will subsequently transmit in predefined frequency channels. The CSI feedback may also use predefined time slots when the device is under network coverage and is synchronized to its serving base station (eNB).

Step 4: Receiving and Evaluating CSI Feedback

The transmitter device (UE#1 in FIG. 4) either continuously or in the predefined time slots, listens on the predefined frequency channels to CSI reports. It also maintains a table of recently decoded and identified potential receiver nodes based on preceding CSI reports. The transmitter device can use this table to periodically compare the preceding CSI reports on e.g. reported large scale fading values to estimate the change in the large or small scale CSI of specific receiver nodes.

If the transmitter does not receive any CSI report from a specific receiver, it may discard that receiver from its CSI table or may mark that receiver as having obsolete CSI information.

Step 5: Determining Transmission Mode and Transmission Parameters

The transmitter device (UE#1 in FIG. 4) uses its updated CSI table to decide on the current set of intended receivers. This can be the case in, for example, a D2D discovery application, in which the transmitter device adjusts its transmission power such that the discovery message should reach its intended receivers with high probability and at the same time tries to minimize the transmit power. Keeping the transmit power level at an appropriate level rather than using maximum power can be useful both to reduce interference at surrounding nodes and for extending the battery life. The transmitter device may also use the CSI table to group intended receivers to a common group, based on, for example similar large scale fading. To such a group, the transmitter device can use multicast using a common MCS configuration and transmit power. Alternatively, if the receivers have different large scale fading, it may decide to send the message with individual MCS values and, possibly using per-receiver node beams to improve the coverage of the message.

As used herein, the non-limiting terms "wireless communication device" and "User Equipment (UE)" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, all or at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an apparatus in a first transceiver device configured to perform device-to-device, D2D, communication with at least one second transceiver device in a cellular network. The apparatus is configured to transmit a reference signal comprising information about an identity of the first transceiver device, and to receive at least one feedback message from a respective second transceiver device, where each feedback message comprises information about the identity of the first transceiver device, information about an identity of the respective second transceiver device that sent the feedback message, and channel characteristics of a radio channel between the first transceiver device and the respective second transceiver device, where the channel characteristics are estimated by the respective second transceiver device. The apparatus is further configured to decide, based on the at least one received feedback message, whether the respective second transceiver device should be included in a set of intended devices to which the first transceiver device will perform a transmission of at least one communication signal. The apparatus is also configured to perform a transmission of the at least one communication signal to the set of intended devices, where the transmission is adapted to the set of intended devices based on the feedback messages received from the respective second transceiver devices included in the set.

In an embodiment, the apparatus is configured to transmit a reference signal by broadcasting the reference signal.

In a particular embodiment the apparatus is configured to adapt the transmission of the at least one communication signal to the set of intended devices by deciding transmission mode and/or determining transmission parameters for the transmission, based on the feedback messages received from the respective second transceiver devices included in the set. The transmission mode may be unicast mode, multicast mode or broadcast mode.

In different embodiments, the transmission parameters may comprise at least one of transmission power, modulation and coding rate, beam selection or beam shape, numerology of an orthogonal frequency-division multiplexing, OFDM, system, and source coding of a payload (for example when the channel quality does not allow for transmission of High Definition (HD) audio or video).

The apparatus may in an embodiment acquire the reference/pilot signal from e.g. a network node such as a base station in the cellular network, or it may in another embodiment be pre-configured in the first transceiver device.

According to another aspect of the proposed technology there is provided an apparatus in a second transceiver device configured to perform device-to-device, D2D, communication with a first transceiver device in a cellular network. The apparatus is configured to receive a reference signal comprising information about an identity of the first transceiver device. The apparatus is further configured to estimate characteristics of a radio channel between the first transceiver device and the second transceiver device, based on the received reference signal. The apparatus is also configured to transmit a feedback message comprising information about the identity of the first transceiver device, information about an identity of the second transceiver device, and the estimated channel characteristics.

In an embodiment, the apparatus is configured to transmit a feedback message by broadcasting the feedback message.

The estimated channel characteristics, or channel state information (CSI), may in different embodiment comprise at least one of received power, estimated path loss or complex channel response, or other suitable channel characteristics. The apparatus may in an embodiment be configured to transmit the feedback message comprising such channel characteristics, together with the identities of the first and second transceiver devices, e.g. in predefined frequency channels. The apparatus may in another embodiment be configured to transmit the feedback message in predefined time slots.

Figure 5:
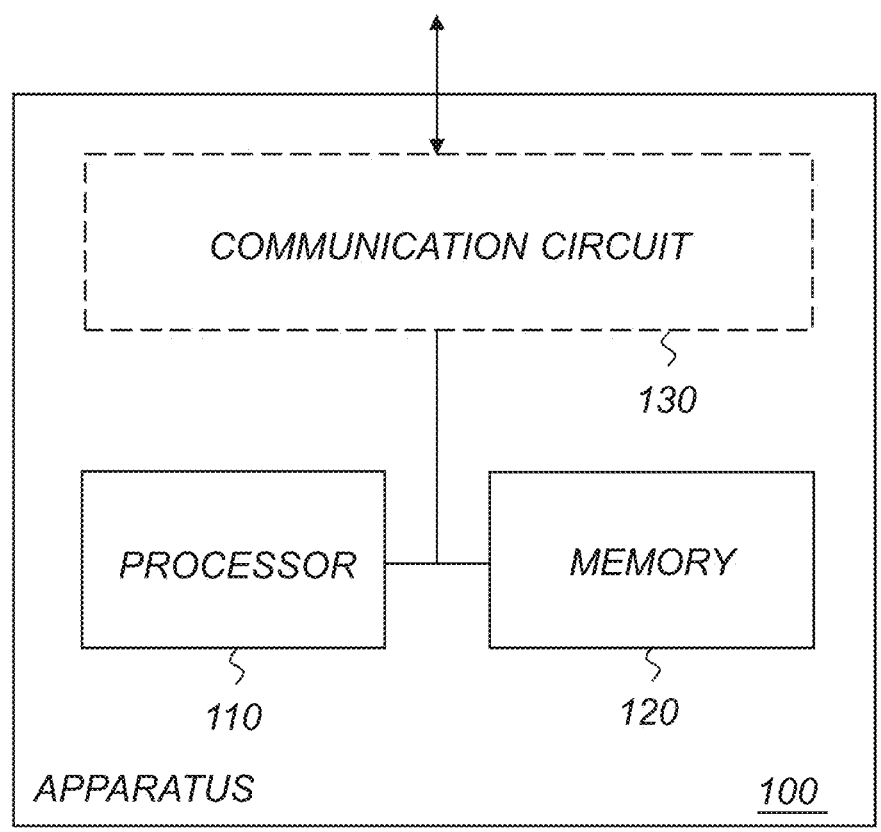
FIG. 5 is a schematic block diagram illustrating an example of an apparatus in a first transceiver device configured to perform D2D communication with at least one second transceiver device in a cellular network according to an embodiment.

FIG. 5 is a schematic block diagram illustrating an example of an apparatus 100 in a first transceiver device, based on a processor-memory implementation according to an embodiment. In this particular example, the apparatus 100 comprises a processor 110 and a memory 120, the memory 120 comprising instructions executable by the processor 110, whereby the processor 110 is operative to perform device-to-device, D2D, communication with at least one second transceiver device in a cellular network.

Figure 6:
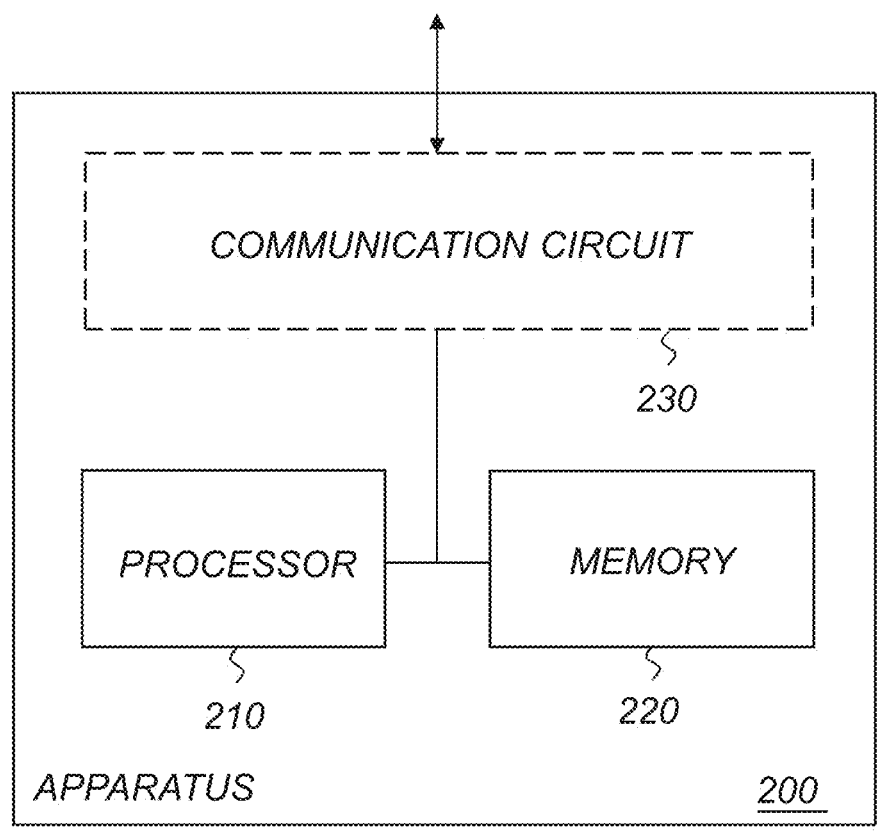
FIG. 6 is a schematic block diagram illustrating an example of an apparatus in a second transceiver device configured to perform D2D communication with a first transceiver device in a cellular network according to an embodiment.

FIG. 6 is a schematic block diagram illustrating an example of an apparatus 200 in a second transceiver device, based on a processor-memory implementation according to an embodiment. In this particular example, the apparatus 200 comprises a processor 210 and a memory 220, the memory 220 comprising instructions executable by the processor 210, whereby the processor 210 is operative to perform device-to-device, D2D, communication with a first transceiver device in a cellular network.

Figure 7:
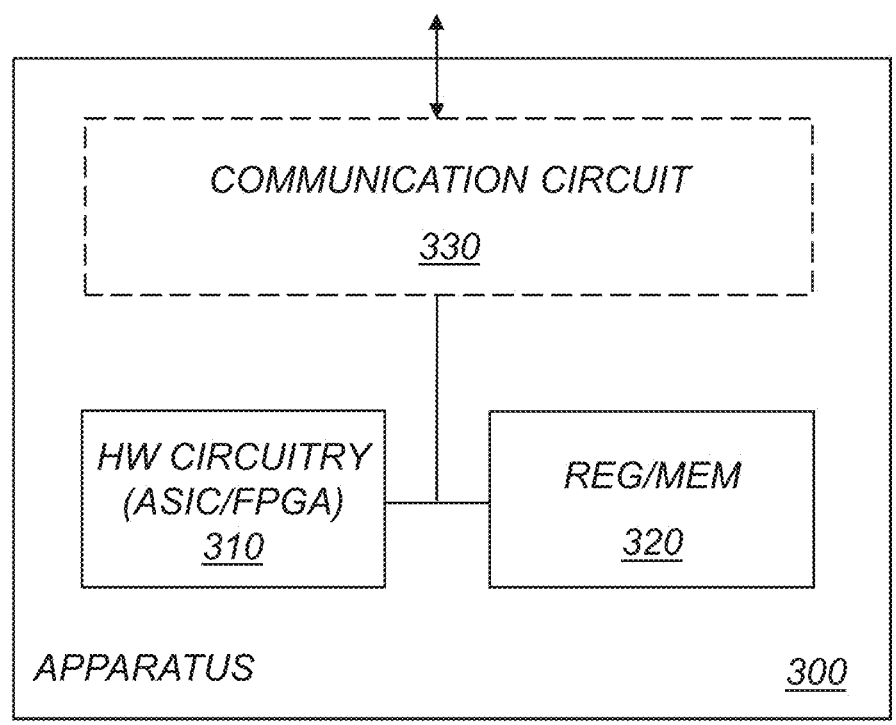
FIG. 7 is a schematic block diagram illustrating another example of an apparatus configured to perform D2D communication in a cellular network according to an embodiment.

FIG. 7 is a schematic block diagram illustrating another example of an apparatus 300, based on a hardware circuitry implementation according to an embodiment. Particular examples of suitable hardware circuitry 310 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 320.

Optionally, an apparatus 100; 200; 300 may also include a communication circuit 130; 230; 330. The communication circuit 130; 230; 330 may include functions for wired and/or wireless communication with other devices and/or network nodes in the network. In a particular example, the communication circuit 130; 230; 330 may be based on radio circuitry for communication with one or more other nodes, including transmitting and/or receiving information. The communication circuit 130; 230 may be interconnected to the processor 110; 210 and/or memory 120; 220. The communication circuit 330 may be interconnected to the hardware circuitry 310 and/or REG/MEM 320. By way of example, the communication circuit 130; 230; 330 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 8:
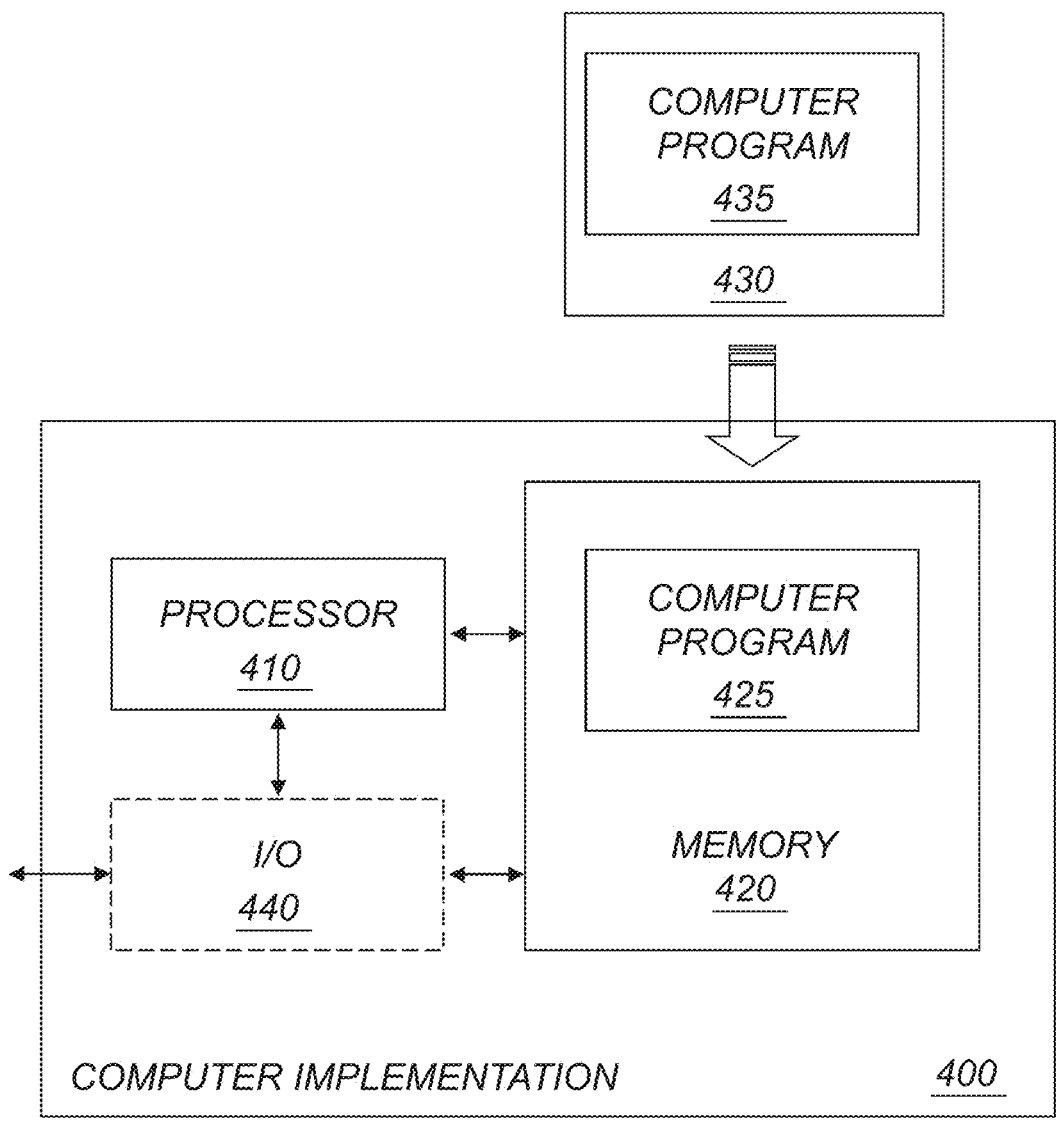
FIG. 8 is a schematic diagram illustrating an example of a computer-implementation according to an embodiment.

FIG. 8 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, a computer program 425; 435 for performing D2D communications with at least one second transceiver device in a cellular network comprises instructions, which when executed by at least one processor 410, cause the processor(s) 410 to prepare a reference signal comprising information about an identity of the first transceiver device for transmission, to input at least one feedback message received from a respective second transceiver device, where each feedback message comprises information about the identity of the first transceiver device, information about an identity of the respective second transceiver device that sent the feedback message, and channel characteristics of a radio channel between the first transceiver device and the respective second transceiver device, where the channel characteristics are estimated by the respective second transceiver device (20), to decide, based on the at least one received feedback message, whether the respective second transceiver device should be included in a set of intended devices to which the first transceiver device will perform a transmission of at least one communication signal, and to prepare a transmission of the at least one communication signal to the set of intended devices, where the transmission is adapted to the set of intended devices based on the feedback messages received from the respective second transceiver devices included in the set.

In another embodiment, a computer program 425; 435 for performing D2D communications with a first transceiver device in a cellular network comprises instructions, which when executed by at least one processor 410, cause the processor(s) 410 to input a reference signal comprising information about an identity of the first transceiver device, to estimate characteristics of a radio channel between the first transceiver device and the second transceiver device, based on the received reference signal, and to prepare a feedback message, comprising information about the identity of the first transceiver device, information about an identity of the second transceiver device, and the estimated channel characteristics, for transmission.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 9:
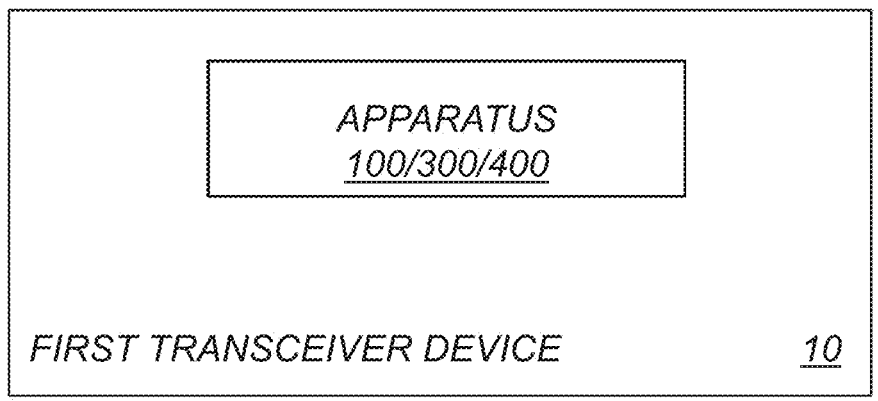
FIG. 9 is a schematic block diagram illustrating an example of a first transceiver device comprising an apparatus configured to perform D2D communication with at least one second transceiver device in a cellular network according to an embodiment.

FIG. 9 is a schematic block diagram illustrating an example of a first transceiver device 10 comprising an apparatus 100; 300; 400 according to any of the embodiments. According to an aspect, there is provided a first transceiver device 10 comprising an apparatus 100; 300; 400 as described herein.

Figure 10:
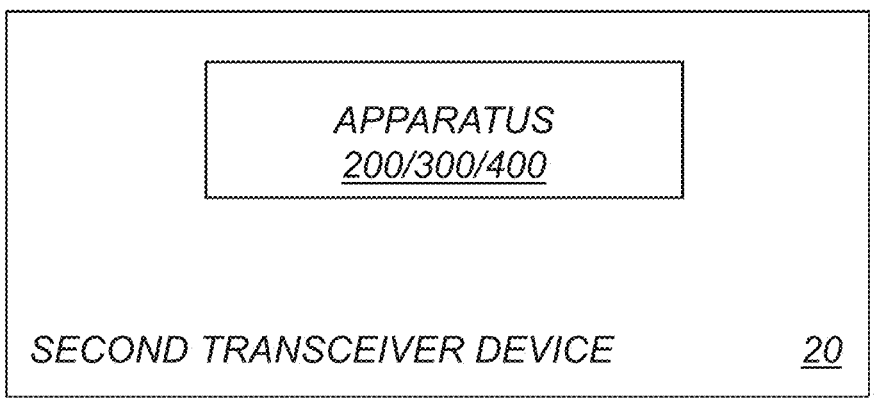
FIG. 10 is a schematic block diagram illustrating an example of a second transceiver device comprising an apparatus configured to perform D2D communication with a first transceiver device in a cellular network according to an embodiment.

FIG. 10 is a schematic block diagram illustrating an example of a second transceiver device 20 comprising an apparatus 200; 300; 400 according to any of the embodiments. According to an aspect, there is provided a second transceiver device 20 comprising an apparatus 200; 300; 400 as described herein.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 11:
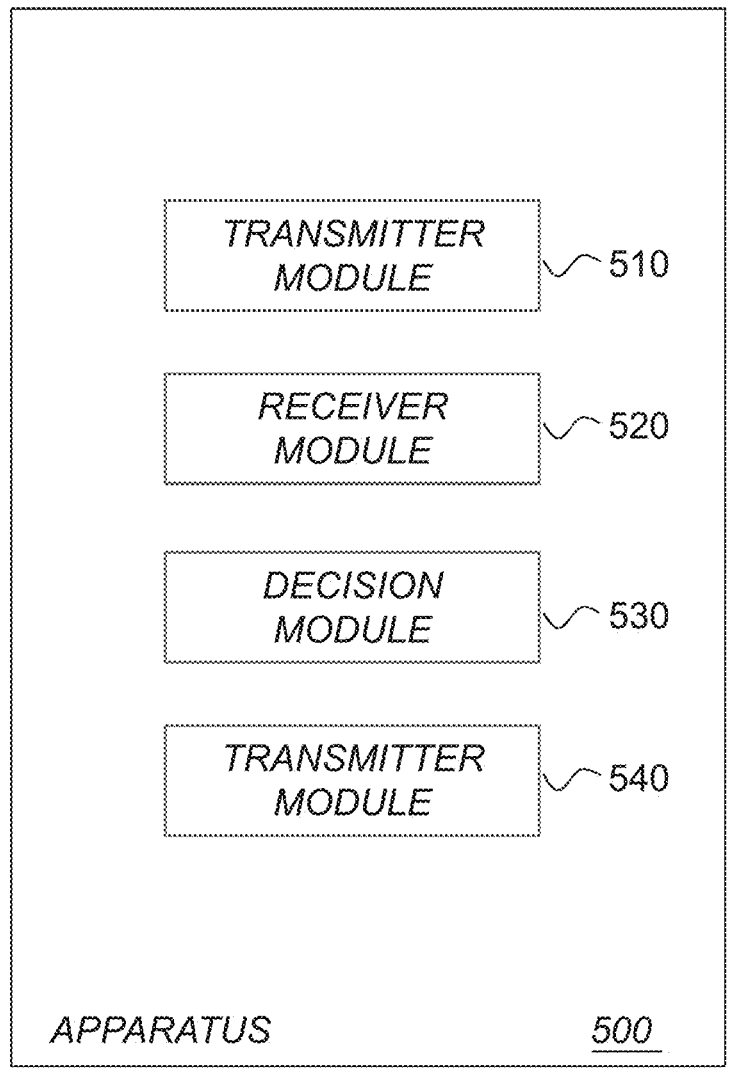
FIG. 11 is a schematic diagram illustrating an example of an apparatus in a first transceiver device for performing D2D communication with at least one second transceiver device in a cellular network according to an embodiment.

FIG. 11 is a schematic diagram illustrating an example of an apparatus 500 in a first transceiver device for performing device-to-device, D2D, communication with at least one second transceiver device in a cellular network. The apparatus 500 comprises a transmitter module 510 for transmitting a reference signal comprising information about an identity of the first transceiver device, and a receiver module 520 for receiving at least one feedback message from a respective second transceiver device, where each feedback message comprises information about the identity of the first transceiver device, information about an identity of the respective second transceiver device that sent the feedback message, and channel characteristics of a radio channel between the first transceiver device and the respective second transceiver device, where the channel characteristics are estimated by the respective second transceiver device. The apparatus 500 further comprises a decision module 530 for deciding, based on the at least one received feedback message, whether the respective second transceiver device should be included in a set of intended devices to which the first transceiver device will perform a transmission of at least one communication signal. The apparatus 500 also comprises a transmitter module 540 for performing a transmission of the at least one communication signal to the set of intended devices, where the transmission is adapted to the set of intended devices based on the feedback messages received from the respective second transceiver devices included in the set.

Figure 12:
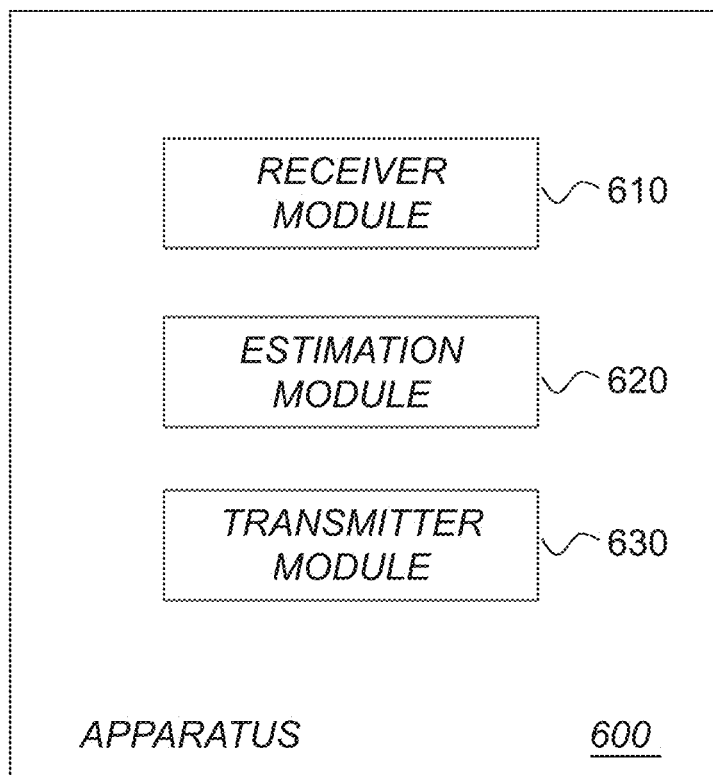
FIG. 12 is a schematic diagram illustrating an example of an apparatus in a second transceiver device for performing D2D communication with a first transceiver device in a cellular network according to an embodiment.

FIG. 12 is a schematic diagram illustrating an example of an apparatus 600 in a second transceiver device for performing device-to-device, D2D, communication with a first transceiver device in a cellular network. The apparatus 600 comprises a receiver module 610) for receiving a reference signal comprising information about an identity of the first transceiver device, an estimation module 620 for estimating characteristics of a radio channel between the first transceiver device and the second transceiver device, based on the received reference signal, and a transmitter module 630 for transmitting a feedback message comprising information about the identity of the first transceiver device, information about an identity of the second transceiver device, and the estimated channel characteristics.

Alternatively it is possible to realize the module(s) in FIGS. 11 and 12 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method performed by a first transceiver device in device-to-device, D2D, communication with at least one second transceiver device in a cellular network, wherein the method comprises the steps of:

transmitting a reference signal comprising information about an identity of the first transceiver device;

receiving at least one feedback message from a respective second transceiver device, each feedback message comprising information about the identity of the first transceiver device, information about an identity of the respective second transceiver device that sent the feedback message, and channel characteristics of a radio channel between said first transceiver device and said respective second transceiver device, where said channel characteristics are estimated by said respective second transceiver device;

deciding whether said respective second transceiver device should be included in or excluded from a set of intended devices to which said first transceiver device will perform a transmission of at least one communication signal, said deciding being based on the at least one received feedback message; and performing a transmission of said at least one communication signal to said set of intended devices, said transmission being adapted to the set of intended devices based on the feedback messages received from the respective second transceiver devices included in the set.

2. The method of claim 1, wherein said transmission of said at least one communication signal is adapted to the set of intended devices by deciding transmission mode and/or determining transmission parameters for the transmission, based on the feedback messages received from the respective second transceiver devices included in the set.

3. The method of claim 2, wherein said transmission mode is one of unicast mode, multicast mode and broadcast mode.

4. The method of claim 2, wherein said transmission parameters comprise at least one of:

transmission power;

modulation and coding rate;

beam selection or beam shape;

numerology of an orthogonal frequency-division multiplexing, OFDM, system;

source coding of a payload.

5. The method of claim 1, wherein said reference signal is acquired from a network node in the cellular network.

6. The method of claim 1, wherein said reference signal is pre-configured in the first transceiver device, and/or determined by the first transceiver device and/or selected by the first transceiver device.

7. The method of claim 1, wherein the step of transmitting a reference signal comprises broadcasting the reference signal.

8. An apparatus in a first transceiver device, configured to perform device-to-device, D2D, communication with at least one second transceiver device in a cellular network, wherein the apparatus is configured to transmit a reference signal comprising information about an identity of the first transceiver device;

wherein the apparatus is configured to receive at least one feedback message from a respective second transceiver device, each feedback message comprising information about the identity of the first transceiver device, information about an identity of the respective second transceiver device that sent the feedback message, and channel characteristics of a radio channel between said first transceiver device and said respective second transceiver device, where said channel characteristics are estimated by said respective second transceiver device;

wherein the apparatus is configured to decide, based on the at least one received feedback message, whether said respective second transceiver device should be included in or excluded from a set of intended devices to which said first transceiver device will perform a transmission of at least one communication signal; and wherein the apparatus is configured to perform a transmission of said at least one communication signal to said set of intended devices, said transmission being adapted to the set of intended devices based on the feedback messages received from the respective second transceiver devices included in the set.

9. The apparatus of claim 8, wherein the apparatus is configured to adapt said transmission of said at least one communication signal to the set of intended devices by deciding transmission mode and/or determining transmission parameters for the transmission, based on the feedback messages received from the respective second transceiver devices included in the set.

10. The apparatus of claim 9, wherein said transmission mode is one of unicast mode, multicast mode and broadcast mode.

11. The apparatus of claim 9, wherein said transmission parameters comprise at least one of:
   transmission power;
   modulation and coding rate;
   beam selection or beam shape;
   numerology of an orthogonal frequency-division multiplexing, OFDM, system;
   source coding of a payload.

12. The apparatus of claim 8, wherein said reference signal is acquired from a network node in the cellular network.

13. The apparatus of claim 8, wherein said reference signal is pre-configured in the first transceiver device, and/or determined by the first transceiver device and/or selected by the first transceiver device.

14. The apparatus of claim 8, wherein the apparatus is configured to transmit a reference signal by broadcasting the reference signal.

15. The apparatus of claim 8, wherein the apparatus comprises a processor and a memory, the memory comprising instructions executable by the processor, whereby the processor is operative to perform device-to-device, D2D, communication with at least one second transceiver device in a cellular network.

16. The apparatus of claim 8, configured to operate within a communication device.

17. A nontransitory computer readable storage medium comprising a computer program for performing device-to-device, D2D, communication with at least one second transceiver device in a cellular network, wherein the computer program comprises instructions, which when executed by at least one processor, cause the at least one processor to perform:

preparing a reference signal comprising information about an identity of the first transceiver device for transmission;

inputting at least one feedback message received from a respective second transceiver device, each feedback message comprising information about the identity of the first transceiver device, information about an identity of the respective second transceiver device that sent the feedback message, and channel characteristics of a radio channel between said first transceiver device and said respective second transceiver device, where said channel characteristics are estimated by said respective second transceiver device;

deciding, based on the at least one received feedback message, whether said respective second transceiver device should be included in or excluded from a set of intended devices to which said first transceiver device will perform a transmission of at least one communication signal; and preparing a transmission of said at least one communication signal to said set of intended devices, said transmission being adapted to the set of intended devices based on the feedback messages received from the respective second transceiver devices included in the set.

18. An apparatus in a first transceiver device for performing device-to-device, D2D, communication with at least one second transceiver device in a cellular network, wherein the apparatus comprises:

a transmitter module for transmitting a reference signal comprising information about an identity of the first transceiver device;

a receiver module for receiving at least one feedback message from a respective second transceiver device, each feedback message comprising information about the identity of the first transceiver device, information about an identity of the respective second transceiver device that sent the feedback message, and channel characteristics of a radio channel between said first transceiver device and said respective second transceiver device, where said channel characteristics are estimated by said respective second transceiver device;

a decision module for deciding, based on the at least one received feedback message, whether said respective second transceiver device should be included in or excluded from a set of intended devices to which said first transceiver device will perform a transmission of at least one communication signal; and a transmitter module for performing a transmission of said at least one communication signal to said set of intended devices, said transmission being adapted to the set of intended devices based on the feedback messages received from the respective second transceiver devices included in the set.

* * * * *